June 8, 1943.     G. W. BREUER     2,321,126
DUST TIGHT BLOWER
Filed April 3, 1941     3 Sheets-Sheet 1

Inventor:
Grant William Breuer
By Lee J. Gary
Attorney.

June 8, 1943.  G. W. BREUER  2,321,126
DUST TIGHT BLOWER
Filed April 3, 1941  3 Sheets-Sheet 2
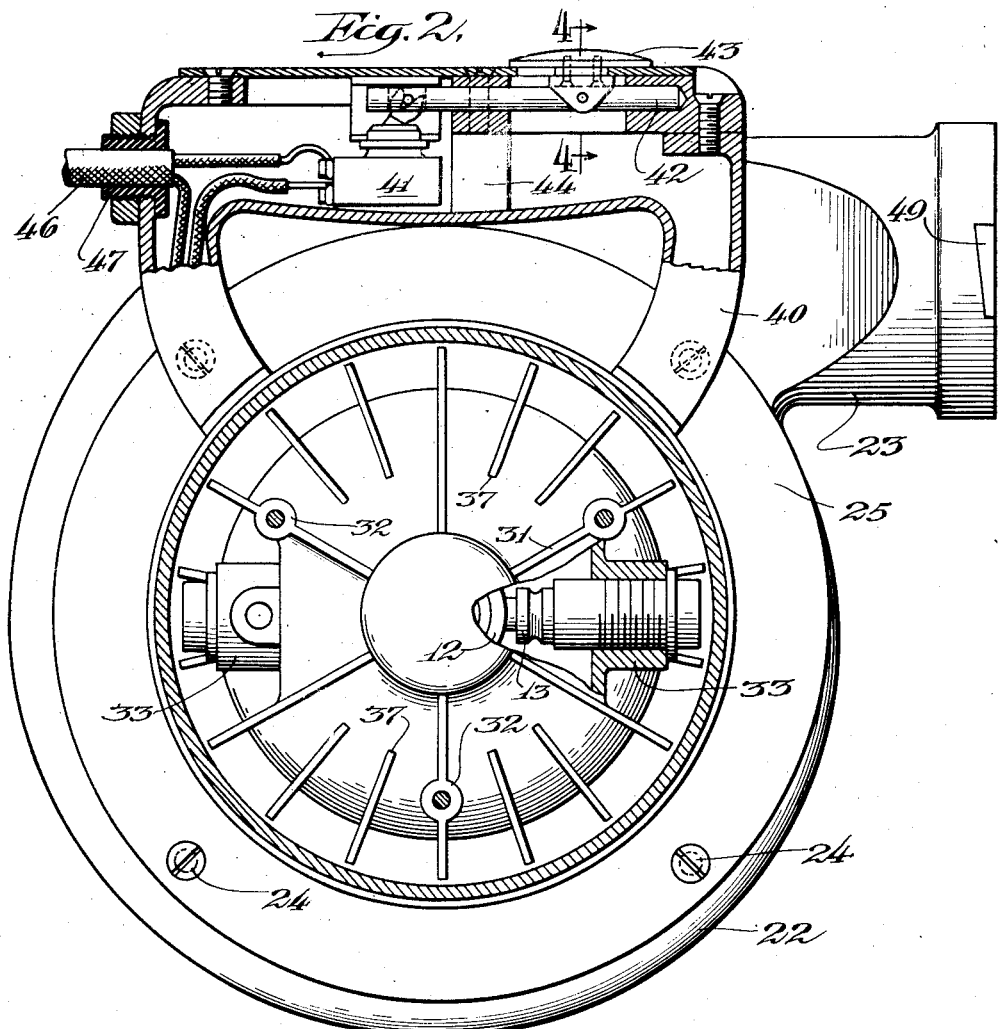
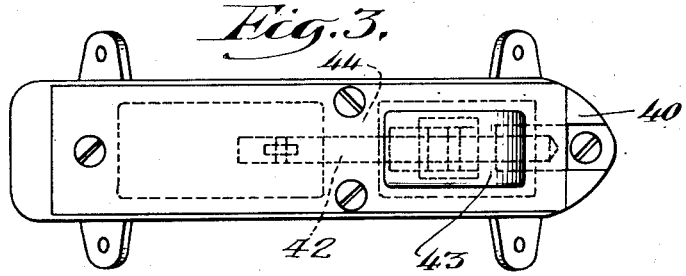
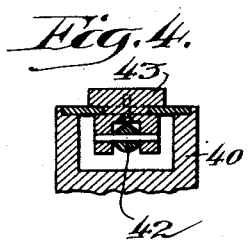
Inventor:
Grant William Breuer
By Lee J. Gary
Attorney

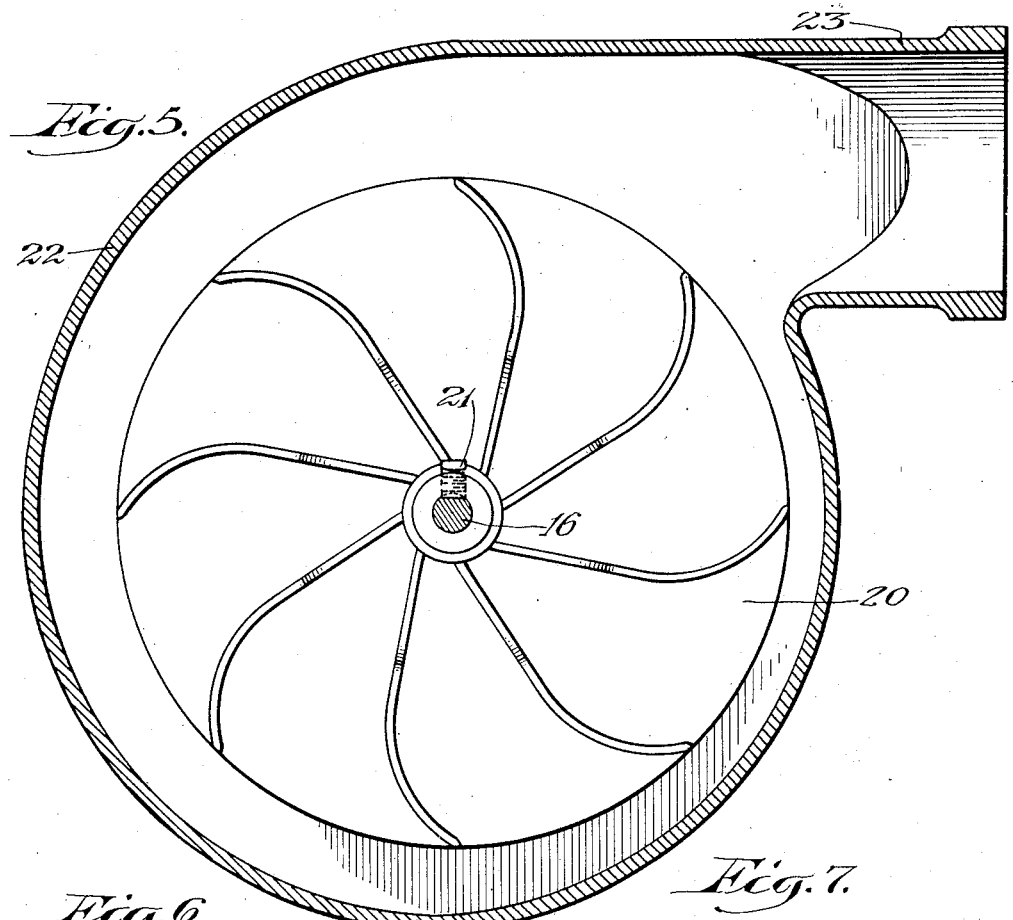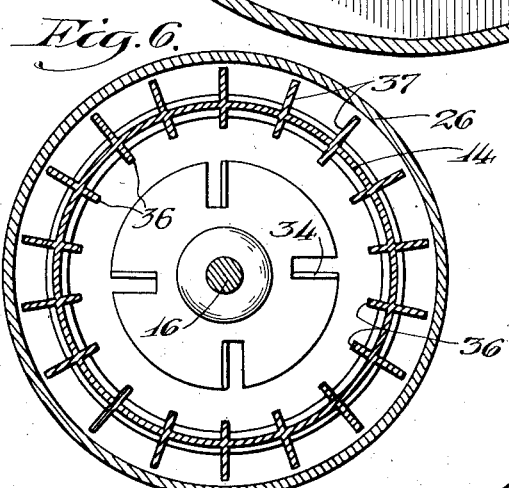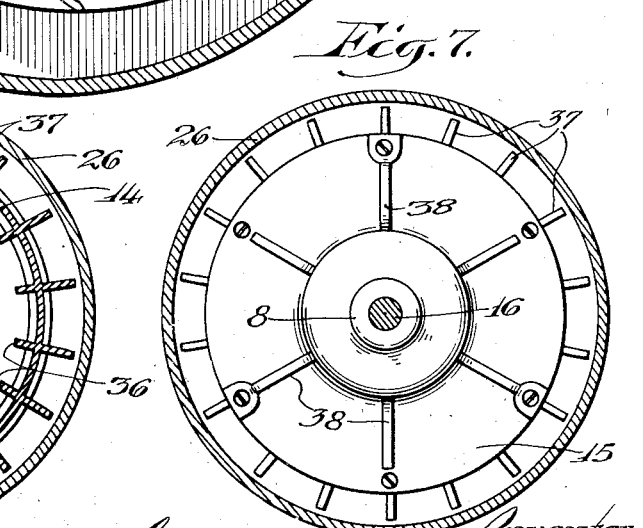

Patented June 8, 1943

2,321,126

UNITED STATES PATENT OFFICE 2,321,126

DUST-TIGHT BLOWER

Grant William Breuer, Chicago, Ill., assignor to Breuer Electric Mfg. Co., Chicago, Ill., a corporation of Illinois Application April 3, 1941, Serial No. 386,676

1 Claim. (Cl. 230—117)

This invention relates to a combined blower and suction device of the portable type, and particularly to a hand portable device which is adapted and readily convertible for use as a blower, sprayer or vacuum cleaner.

It is an object of this invention to provide an improved portable blower and suction device construction so as to provide a totally enclosed motor, commonly referred to as dust tight, for use in hazardous locations such as grain handling and storage plants.

Another object relates to an improved blower and suction device provided with a dust tight enclosed motor, and wherein means are provided for heat conduction and internal and external air circulation for cooling the motor and maintenance of its operating efficiency.

Another object is to provide a blower device having a dust tight enclosed motor, constructed so as to cause the stream of delivered air to first cool the motor and its parts and then to be delivered in a condition heated above the temperature of the surrounding atmosphere, to be useful in the dislodging of dust, dirt and moisture from motors, switch boards, and other electrical and mechanical equipment where dust, dirt and moisture, if allowed to remain might cause overheating, excessive friction, fire hazards, and the like.

Another object relates to an improved blower and suction device of the hand portable type having an enclosed dust tight motor and a likewise commercially acceptable dust tight actuating switch mechanism so that no exposed potential sources of electrical sparks to a dust-laden atmosphere is present in the device.

Other objects relate to the economies of construction and the details and arrangement of parts which will be apparent from a consideration of the specification and drawings, wherein:

Fig. 2 is a section on the line 2—2 of Fig. 1.

Fig. 3 is a plan view of the handle of my device.

Fig. 4 is a section on the line 4—4 of Fig. 2.

Fig. 5 is a section on the line 5—5 of Fig. 1.

Fig. 6 is a section on the line 6—6 of Fig. 1.

Fig. 7 is a section on the line 7—7 of Fig. 1.

Figure 1:
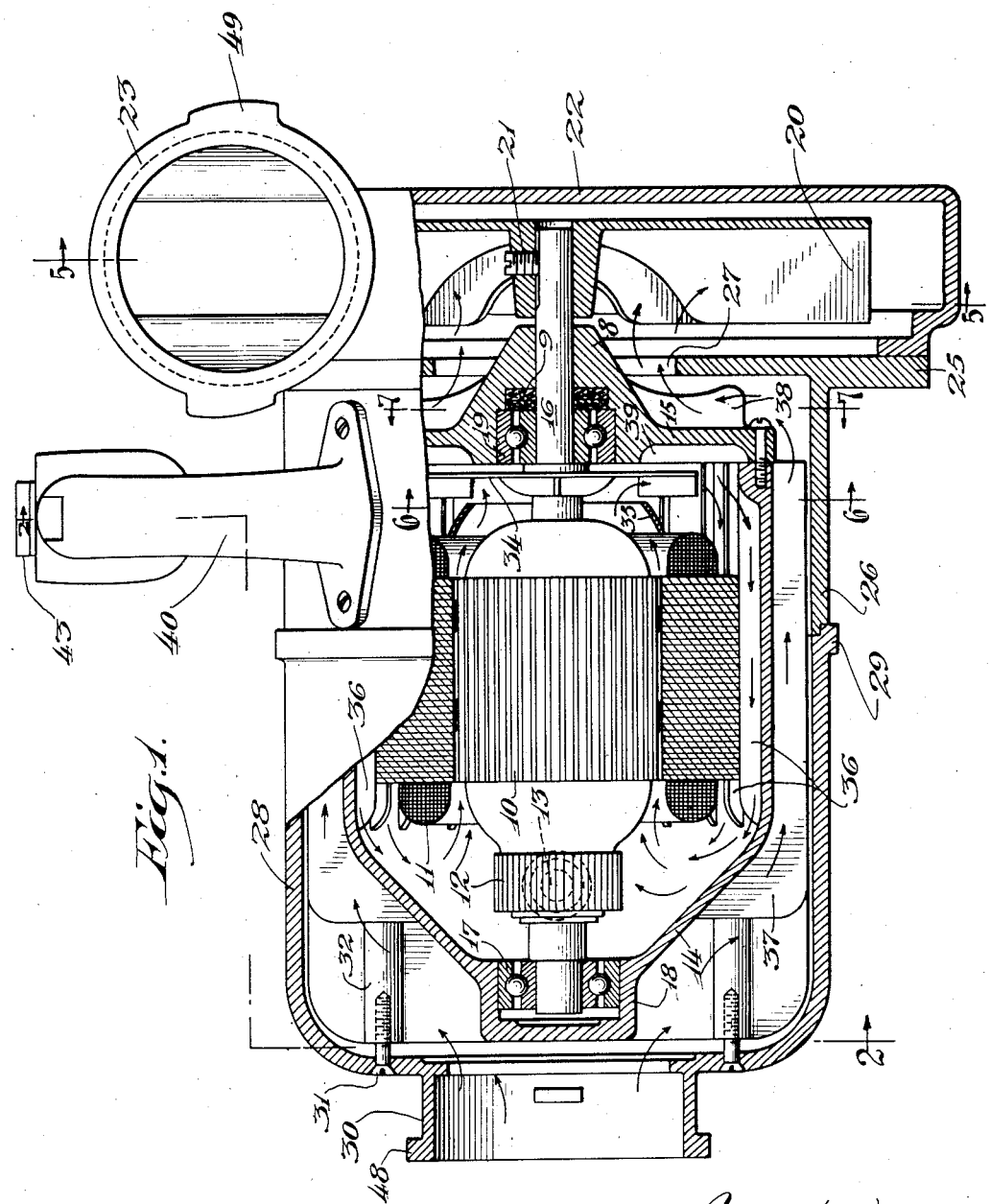
Fig. 1 is a side elevational view of my suction and blower device, largely in section.

Referring to the drawings, my combination suction and blower device comprises a high speed universal type driving motor having its armature 10, field 11, commutator 12 and brushes 13 completely enclosed within a housing composed of the hood portion 14 and end closure plate 15. By use of this type of motor I am enabled to provide an efficient hand portable blower and suction cleaner as distinguished from usual dust tight constructions which employ the conventional type of slow speed motor which is heavier and not hand portable. The motor shaft 16 is journaled at one end in the bearing 17 seated in the domelike end portion 18 of the hood 14, and at its other end in the bearing 19 seated in the plate 15 through which it extends. The plate 15 is provided with an external elongated axial boss 8, which aided by the felt sealing washers 9, prevents dust from traveling into the motor housing along the motor shaft.

A centrifugal fan 20, for the purpose of creating suction, or for delivering a strong blast of air when the device is used as a blower or sprayer, is secured as at 21, to the end of the motor shaft 16 which extends through the closure plate 15, the fan being enclosed by the fan casing 22 which is provided with the tangential exhaust port 23. The fan casing 22 is secured by suitable means, such as the screws 24 to the flange 25 of the outer body casing portion 26, and is in communication therewith through the axial annular inlet 27. The outer body casing is preferably composed of two portions, so that in addition to the portion 26 I provide a hood-like portion 28 having an annular seat 29 for engagement with the portion 26, the dome of the body portion 28 being provided with the axial inlet port 30. This outer body casing hood portion 28 is held in engagement with the portion 26 and with the motor housing portion 14, by suitable means such as the screws 31 extending into the bosses 32, and in like manner may be conveniently disengaged for access to the motor brushes 13 which extend through the carbon brush retaining portion 33 of the motor housing 14. Likewise ready ability to remove the outer body casing hood portion 28 provides ready access for the purpose of removing accumulations of dust from the outer surface of the motor housing which may have been deposited from atmospheric dust drawn through the inlet port 30.

For the purpose of cooling the thus enclosed motor during operation of the device, I provide an internal air circulation by means of the blower fan 34 secured to the motor shaft 16, aided by the annular baffle 35. As indicated by the arrows in Fig. 1, this fan 34 draws air from the area at the forward end of the motor enclosure through the space between the armature 10 and field 11, whence it is guided by the baffle 35 to the center of the fan 34. The fan then throws the air outward through the space between the field 11 and the motor enclosure 14 to the forward area of the enclosure, thus completing the internal air circuit which is continuous during the operation of the device. While making this circuit, the air absorbs heat from the carbon brushes 13, the commutator 12, armature 10 and field 11, the heat being dissipated from the enclosed air to the metal of the motor enclosure.

To aid in this conduction of heat the motor enclosure 14 is provided with a plurality of internal longitudinally extending absorption fins 36, thus providing a large and increased surface area to insure rapid heat absorption by the inner surface and conduction of heat to the outer surface of the housing 14, the outer surface being provided with a plurality of heat radiation fins 37, these fins 37 being shaped and spaced in a manner whereby back pressure within the device is at a minimum. If desired, as indicated, the motor housing closure plate 15 may also be provided with radial radiation fins 38 externally, and absorption fins 39 internally. The motor housing 14 and its cover plate 15, and particularly all of the aforesaid absorption and radiation fins are preferably constructed of aluminum for rapid transfer of heat and lightness of weight.

In the operation of my device the fan 20 causes a large volume of air to be drawn in at a high velocity through the inlet port 30, and since the inlet port 30 is at an axial end of the casing opposed to the axial outlet therefrom which communicates with the fan casing 22, the stream of air is caused to pass between the external body casing and the sealing motor housing and to thereby wash all portions of the motor housing and its external radiation fins to cause a rapid exchange of heat therewith, and which aided by the internal air circulation, previously described, cause a continuous and rapid cooling of the motor and its various parts. At the same time the air delivered through the fan outlet 23 is delivered at a temperature above atmospheric, or above that of the surrounding atmosphere for the purposes and attendant benefits previously set forth.

Fixedly secured to a convenient portion of the outer casing, such as to the portion 26 is a chambered handle 40 to provide a convenient grip for the operator. This handle houses a switch 41, in a manner whereby the operator can with the same hand by which the unit is held, regulate the starting and stopping of the drive motor. It will be understood that the illustrated type of switch 41 is largely diagrammatic and only indicative of many different types of switches which may be employed in like manner. It is, however, an additional object of this handle construction to house the switch 41 in such a manner as to be considered dust tight for safe operation in hazardous locations. For this purpose there is provided a reciprocating arm 42 which transfers sliding movement from the outer switch button 43 to the switch 41 by traveling through the internal handle chamber partition 44 which is of at least one-half inch in thickness and bored to close tolerance for passage of the arm 42, and thus provides the necessary safety factor for the operation of a make and break type of switch, such as the switch 41, in hazardous locations.

To additionally insure against the ingress of dust through the handle 40, the electrical conduit 46 enters it through the bushing 47 at close tolerances with about one-half inch or more of travel. Adjacent to this point of conduit entrance at the inside of the handle 40 there may be provided, although not illustrated, suitable means for eliminating strain on the conduit 46, so as to prevent possible disengagement thereof and to prevent short circuits, sparks, etc.

It will thus be seen that I have provided a dust-tight unit wherein all electrical parts are enclosed against the ingress of dust, including the driving motor and switch mechanism, so as to permit use thereof in hazardous locations, especially those having potentially explosive dusts.

For use as a suction cleaner a suction mouth nozzle may be conveniently attached to the inlet port 30 by means of the bayonet fixtures 48, or as in more common practice, there may be first attached a hose attaching means to which in turn a hose and suction mouth is then attached, and a dirt bag may be secured to the fan chamber exhaust port 23 by means of the bayonet fixtures 49. For use as a sprayer or blower, suitable devices, conduits or nozzles may be secured to the exhaust port 23, air being drawn in through the port 30 and delivered in heated condition. It will be apparent, however, that whether my device be used as a suction cleaner or blower, that due to its construction and major arrangement of parts, the centrifugal fan 20 has the combined function of cooling the enclosed dust tight motor and at the same time efficiently carrying out the blowing or suction creating function to permit the device to efficiently operate as a portable blower, sprayer or suction cleaner, the fan being enclosed in a separate housing and providing directional flow and velocity to the air drawn in through the inlet orifice of the unit.

I claim as my invention:

A portable device of the class described adapted for use as a blower, sprayer or suction cleaning means, comprising a high speed universal type drive motor, a dust tight metallic enclosure for said motor in spaced relation to the stator thereof, a blower fan on the shaft of said motor within said enclosure and adjacent baffle means for directionally circulating air therein, a body casing surrounding said motor enclosure in spaced relation thereto, an axial inlet port at one end of said body casing, a fan casing at the opposed end of said body casing and in communication with an axial outlet opening thereat, a motor driven fan in said fan casing, and a tangential outlet port extending from said fan casing, the said dust tight motor enclosure being in the form of a hood having an integral axial dome seating one end of the motor shaft and its bearing and an end closure plate therefor having an elongated outwardly projecting boss providing a journal for a projecting fan engaged end of the motor shaft and a seat for its bearing, the said dust tight motor enclosure being further provided with radially projecting elongated carbon brush retention bosses, longitudinally extending ribs projecting from its inner surface to the motor stator, longitudinally extending ribs projecting from its outer surface to the body casing, and endwise outwardly projecting radially extending ribs on the dome end and cover plate thereof, said body casing being engaged to said motor enclosure and longitudinally slidably separable therefrom to permit access to the carbon brushes and their retainers and to permit removal of accumulated dust from the exterior portions of the motor enclosure.

GRANT WILLIAM BREUER.